United States Patent [19]

Buckley et al.

[11] 4,168,322
[45] Sep. 18, 1979

[54] PROTEIN PRODUCT

[75] Inventors: Keith Buckley, Melton Mowbray; Philip J. Lowe, Dunkirk, both of England

[73] Assignee: Mars Limited, London, England

[21] Appl. No.: 825,223

[22] Filed: Aug. 17, 1977

Related U.S. Application Data

[63] Continuation of Ser. No. 551,314, Feb. 20, 1975, abandoned.

[30] Foreign Application Priority Data

Feb. 27, 1974 [GB] United Kingdom ................ 8935/74

[51] Int. Cl.$^2$ ........................... A23C 21/00; A23J 3/00
[52] U.S. Cl. .................................... 426/250; 426/331; 426/332; 426/334; 426/532; 426/573; 426/574; 426/641; 426/657
[58] Field of Search ............... 426/331, 332, 334, 540, 426/573, 574, 641, 657, 583, 250, 532

[56] References Cited

U.S. PATENT DOCUMENTS

| | | | |
|---|---|---|---|
| 2,555,514 | 6/1951 | Sharp et al. | 426/583 |
| 2,695,235 | 11/1954 | de Goede | 426/583 |
| 3,469,995 | 9/1969 | Jacoby et al. | 426/271 |
| 3,653,908 | 4/1972 | Buck et al. | 426/646 X |
| 3,713,837 | 1/1973 | Leidy et al. | 426/573 X |
| 3,812,268 | 5/1974 | Corey et al. | 426/646 X |

*Primary Examiner*—Robert A. Yoncoskie
*Attorney, Agent, or Firm*—Davis, Hoxie, Faithfull & Hapgood

[57] ABSTRACT

A protein food product is described, together with a process for making it. Whey protein derived from milk is adjusted to a pH of 6 to 9 and coagulated by heat, thereby giving a firm, non-brittle material which is useful as a protein food in its own right, or as a matrix for composite products, or in the manufacture of pieces resembling meat offals such as kidney, to improve the texture of meat-containing mixes, for example of sausage type, and for other food products, all of which are useful as protein foods for animals and also for human beings.

11 Claims, No Drawings

PROTEIN PRODUCT

This is a continuation of application Ser. No. 551,314, filed Feb. 20, 1975, now abandoned.

The present invention relates to protein products that are of value as food, more especially for animals, but also for human beings.

Whey protein (that is, the protein content recoverable from wheys of milk origin) have been obtained having various functional properties by separation from acidic cheese and casein wheys, followed by spray or other drying. Separation techniques which have been employed include direct acid precipitation of concentrated whey solutions at elevated temperatures, precipitation of acid wheys as metal-protein complexes, e.g., ferric whey precipitate at pH 2.5, and precipitation of the protein by addition of salt, e.g., ammonium sulphate, at pH 4.0. The recovery of whey proteins by ultrafiltration of acidic wheys has also been described.

The acidic whey protein obtained by these procedures is coagulable by heat but normally yields a hard, brittle product of relatively low value as a binding agent. In the recent past therefore, although techniques have been established whereby functional whey proteins can be obtained from whey (generally regarded as a waste product), the whey protein obtained has had limited applications and value.

We have now found that if the pH value of whey protein is adjusted to within the range 6 to 9 at some stage prior to heat coagulation and is coagulated at such a pH, then the coagulated product has a firm coherent texture well suited to function as a protein matrix for food products or as the basis for simulated animal products. It is also very valuable as a binder in meat-containing products. The pH adjustment can be carried out by neutralising normal commercially available, dried, acidic whey protein, for example at the time of formulation of the product, but can instead be carried out on the freshly precipitated protein before drying. In any case, a similar product is ultimately achieved after heat coagulation.

Accordingly, the present invention comprises a process for the production of a protein food product in which whey protein is adjusted to a pH value in the range of 6 to 9 and heated in aqueous solution or dispersion at this pH to coagulate the protein.

A variety of alkaline substances can be used for the neutralisation of acidic whey protein. Alkali metal hydroxides, such as sodium or potassium hydroxide, are convenient but other hydroxides, such as calcium hydroxide, or salts of alkaline reaction, such as sodium or potassium carbonates, sodium tripolyphosphate or tripotassium orthophosphate can also be used. Where the neutralisation is carried out at the stage of formulation of the product the use of carbonates can give aeration of the product and result in a product having a texture similar to that of a meat loaf.

In the simplest application of the invention, an aqueous solution or dispersion of whey protein is neutralised to within the stated pH range and then heat coagulated to a firm, coherent mass, which can be used, with flavouring, as a foodstuff, more especially for non-human use.

If the whey protein solution or dispersion is sufficiently viscous, whether by virtue of a high concentration of whey protein or by addition of thickeners, such as guar gum, to the dispersion, to which may also be added fats, colouring matter and other additives including nutritional supplements, the dispersion may readily be blanched in boiling water (for example after extrusion) to form firm, coherent pieces which simulate offal meats such as kidney, and which may then be used in canned food products. The whey protein dispersion at pH 6 to 9 possesses good fat emulsification properties, so that substantial proportions of fat, which is nutritious but relatively cheap, can be incorporated into the product without giving it an unacceptable, greasy feel.

The neutralised whey protein can also be advantageously employed in admixture with vegetable proteins such as wheat gluten, cotton seed protein and, more especially soya protein flours, concentrates or isolates. These proteins alone do not produce firm, coherent chunks on blanching in water, but in a dispersion containing whey protein at pH 6 to 9 they modify the texture of the chunk, giving increased elasticity and toughness.

Preferred formulations for coagulated, e.g. blanched, chunk products, for example simulating kidney, based on whey protein contain 15–70% by weight whey protein, 30–85% water and 0–45% other edible material. Where other substances having a thickening or binding property are present, the proportion of whey protein can be less than 15%.

In another type of product in accordance with this invention, meat, meat by-products or other protein of animal origin, e.g., sodium caseinate, is incorporated in the whey protein solution or dispersion or, conversely, neutralised whey protein may be incorporated as a binder in a meat-based product to modify or improve the texture or flavour. Such products can be used for human food or for animal food. When meat or meat by-products are used in admixture with whey protein it is preferred either to use denatured meats or proteins or a meat of low iron content (e.g., chicken meat), or to add a chelating agent for iron, such as trisodium citrate or EDTA, in proportion to the level of undenatured animal protein. As an example of the use of neutralised whey protein in a meat-based product may be mentioned sausage, where the whey protein can be used to toughen the texture and reduce the amount of binding meat required. The amount of whey protein that can be incorporated is limited by the necessity for a high level of chelating agent if much meat is present.

In meat-containing products of this type, preferred formulations contain 15–60% by weight whey protein, 40–80% meat or meat by-products, 0–45% added water, 0–20% other edible materials and 0–70½% sequestrant. It will be appreciated that by the term "meat" is meant not only the flesh of mannals but also that of other animals, such as fish, poultry or crustacea. Similarly, "meat by-products" refers not only to blood and offals of mammals but also to the corresponding portions of other animals.

In yet another modification of the invention, the whey protein coagulated at pH 6 to 9 serves as a proteinaceous matrix to bond other food materials in a composite food. Such other foodstuffs may include cereals, ceral products such as rusk and biscuit, and nuts. The added solid foodstuffs may be in the form of ground powder or meal or granules or pieces. Fat, flavouring, colouring and other additives may be included, and the products may serve as complete foods. They can, for example, be adapted for use as complete dog foods, in place of conventional complete dry dog foods, but products of this type can also be suitable for human food, depending on the nature of the solid foodstuffs incorporated.

Another variant of the invention is to include in the whey protein product a proportion of one or more than one water-soluble humectant substance sufficient to maintain a desired moisture content and reduced water activity ($A_w$) in the product, for example in the dry or semi-dry range from 5 to 20% moisture or in the semi-moist range from, say, 20 to about 45%. In this way products can be obtained with a softer texture, and which may be stored without sophisticated packaging without hardening or bacteriological deterioration. Suitable humectants include polyhydric alcohols, sugars, salts, other non-toxic low molecular weight water-soluble compounds, low molecular weight polypeptides, including fish solubles, or mixtures of these.

Particularly preferred products of this kind have a moisture content in the range 5 to 20%, and more especially 15 to 20%, and a water activity in the range 0.50 to 0.75, and more especially about 0.65. This commonly requires a level of humectant substances of 15 to 20% by weight of the product. Preferred formulations for this semi-dry type of product contain as essential ingredients 5-50% by weight whey protein, 0-20% fat and 5-25% humectant, with a moisture content of 5-20% and a water activity of 0.60-0.75.

It is equally possible to utilize the invention in the preparation of products of higher moisture content, for example with moisture contents in the range 20 to 45%, the level of humectant being adjusted to produce a water activity in the product which confers bacteriological stability, notably in the range 0.75 to 0.85. Preferred formulations for such semi-moist products contain 10-40% by weight whey protein, 10-40% humectant, and 0-20% other edible material, with a moisture content and water activity in the ranges just mentioned.

The various modifications of the invention may be combined. Thus a whey protein matrix may incorporate a number of particulate or granular foodstuffs and may also contain a suitable amount of humectant to confer on the product a softer texture which is maintained during storage at ordinary temperatures and relative humidities. A particularly preferred formulation for such a product contains 5-50% by weight whey protein, 0-20% fat, 15-60% solid foodstuff or edible matter, 5-25% humectant and 5-20% water, and the product has a water activity of 0.60-0.75.

The following are examples of the practice of the invention.

EXAMPLE 1

This example provides a simulated animal product formed from a whey protein dispersion containing a thickener.

| | |
|---|---|
| Whey protein (acidic) | 30.0% by weight |
| Water | 53.7% by weight |
| Dried blood | 1.7% by weight |
| Dyestuff solution | 2.4% by weight |
| Beef dripping | 10.0% by weight |
| Guar Gum | 1.0% by weight |
| Sodium hydroxide | 1.2% by weight |

The ingredients were mixed together in a high speed homogeniser, the sodium hydroxide being first dissolved in the water. The mix, which had a pH of 7.5, was then extruded through a mincer into a hot water bath at 95° to 100° C. The extruded cylinders were cut off into ¾-inch pieces at the mincer plate, blanched in the hot water for 3 minutes and cooled.

The product was firm and coherent and had a smooth internal texture closely similar to that of organ meats such as kidney. It may if desired be passed through a cutting machine to simulate the sharp edge appearance of cut kidneys.

The product was sufficiently tough to withstand mechanical handling. After sterilisation in cans in a meat mix, the product surface readily shed the gravy and meat mousse background in a similar manner to the surface of real kidney.

EXAMPLE 2

Example 1 was repeated but with the substitution of 8.3% fresh blood and 1.0% trisodium citrate for the dried blood. The amount of water was adjusted accordingly to 46.1%.

The product obtained was similar to that of Example 1.

EXAMPLE 3

Example 1 was repeated with the exception that instead of sodium hydroxide potassium carbonate was added until a pH of 8.0 was achieved.

The resulting product had an aerated texture similar to that of meal loaf.

EXAMPLE 4

This example demonstrates the use of vegetable protein in conjunction with the whey protein.

Example 1 was repeated but with the substitution of 20% whey protein and 10% soya protein concentrate for the 30% whey protein of the original example.

The product obtained was in the form of a very tough chunk with a dense lung-like texture.

EXAMPLE 5

This example demonstrates the use of whey protein to bind meats in a sausage type product.

| | |
|---|---|
| Whey protein (acidic) | 25.3% by weight |
| Meat off-cuts | 23.7% by weight |
| Tripe | 11.9% by weight |
| Trotters | 15.4% by weight |
| Blood | 15.2% by weight |
| Salt | 2.3% by weight |
| Trisodium citrate | 5.0% by weight |
| Sodium hydroxide | 1.2% by weight |

The sodium hydroxide and trisodium citrate were dissolved in the blood and immediately mixed with the meats which had previously been finely macerated. The mix, which had a pH of 7.5, was extruded through a mincer plate and blanched as in Example 1. The product was a firm discrete chunk similar to meat balls prepared in a similar way but having the whey protein replaced with expensive binding meat. The final pH of the product was about 6.6.

EXAMPLE 6

This example demonstrates the use of whey protein neutralised prior to drying.

To 3 liters of cheese whey was added sufficient hydrochloric acid to reduce the pH of the solution to 4.0. The solution was heated to the boil and 5 ml of 30% calcium chloride was added dropwise with stirring. After 15 minutes the mixture was cooled to room temperature and centrifuged at 5000 rpm for 10 minutes to collect the precipitate. After being washed twice with dilute hydrochloric acid solution the sediment, comprising the whey protein, was neutralised to pH 7.0 with sodium hydroxide solution and dried at 60° C. in an oven.

The following formulation was made up:

| | |
|---|---|
| Neutralised whey protein | 30% by weight |
| Water | 64.9% by weight |
| Dried blood | 1.7% by weight |
| Dyestuff solution | 2.4% by weight |
| Guar gum | 1.0% by weight |

The mixture was heat coagulated as described in Example 1 and produced coherent firm chunks. In contrast, whey protein separated and dried without neutralisation, did not produce chunks when used in the same formulation by the same process, but merely separates as a scum.

The two following examples describe the production of complete food products containing humectants and antimycotics and are suitable for storage under ambient conditions without loss of texture.

EXAMPLE 7

| | |
|---|---|
| Dry mix: | |
| Whey protein | 12.6% by weight |
| Sodium caseinate | 12.6% by weight |
| Rusk | 44.1% by weight |
| Beef dripping | 5.0% by weight |
| Vitamin mix | 4.6% by weight |
| Choline chloride solution | 0.2% by weight |
| Glycerol | 5.0% by weight |
| Sucrose | 13.5% by weight |
| Salt | 1.5% by weight |
| Potassium sorbate | 0.3% by weight |
| Dyestuff solution | 0.6% by weight |
| Wet mix: | |
| Dry mix | 78.03% by weight |
| Water | 21.14% by weight |
| Sodium hydroxide solution (25% w/w) | 0.83% by weight |

The dry ingredients were weighed into a bowl mixer fitted with a spade attachment and the beef dripping (at 60° C.), dye solution and glycerol, water and sodium hydroxide solution were added during mixing.

The wet mix, which had a pH of 6.5, was spread in a ¾-inch layer on greased trays, the surface brushed with fat and the mix baked at 375° F. for 21 minutes in an air-circulating oven.

The final product was cut into ¾-inch sized pieces and packed. The product had a moisture content of 15.2% and a water activity ($A_w$) of 0.70.

In a dog feeding trial the product was found to have a much higher acceptance than a traditional dry complete dog food, which had a cereal-based structure.

The product had a sweet, nutty taste to the human palate and a firm, coherent texture, whereas a similar product prepared without neutralising the whey protein had not only a hard, brittle texture but a sour, unpleasant taste.

After storage for one month at ambient temperature in the relative humidity range of 55–80% the product was found to be bacteriologically stable and had retained its firm, coherent texture.

EXAMPLE 8

| | |
|---|---|
| Dry mix: | |
| Whey protein | 13.0% by weight |
| Sodium caseinate | 13.0% by weight |
| Arachis oil | 5.0% by weight |
| Roasted peanuts | 45.0% by weight |
| Vitamin mix | 4.6% by weight |
| Choline chloride solution | 0.2% by weight |
| Glycerol | 5.0% by weight |
| Sucrose | 13.5% by weight |
| Potassium sorbate | 0.1% by weight |
| Dyestuffs solution | 0.6% by weight |
| Wet mix: | |
| Dry mix | 78.03% by weight |
| Water | 21.14% by weight |
| Sodium hydroxide solution (25% w/w) | 0.83% by weight |

The product was prepared as described in Example 7 (the mix having a pH of 6.8) and had a firm, coherent texture, and could readily be cut into suitably sized pieces. The final pH of the product was 6.0.

We claim:

1. A protein food product comprising firm, coherent pieces having a matrix comprising heat-coagulated whey protein, said coherent pieces comprising 40 to 80% animal products selected from the group consisting of meat and meat by-products and mixtures thereof, said food product having an effective amount up to 20% other edible materials selected from the group consisting of fat, colorants, nutritional supplements, and thickeners, said animal products being embedded in and bonded together by said matrix; said whey protein, constituting 15 to 60% by weight of said food product, having been separated from whey under acidic conditions, and having at coagulation a pH of 6 to 9 thereby providing the firm, coherent gel structure of said matrix.

2. A protein food product comprising firm, coherent pieces having a matrix comprising heat-coagulated whey protein, said whey protein constituting 5–50% by weight of said food product and having been separated from whey under acidic conditions, said protein having at coagulation a pH of 6 to 9 thereby providing the firm, coherent gel structure of said matrix, said food product additionally including at least one water soluble humectant in sufficient quantity to confer bacteriological stability on the product.

3. A food product according to claim 2 further comprising an effective amount up to 20% fat, 15 to 60% solid foodstuff selected from the group consisting of meat, meat by-products and cereals, 5 to 25% humectant and 5 to 20% moisture, and having a water activity in the range of 0.60 to 0.75.

4. A food product according to claim 2 comprising 10 to 40% said whey protein, an effective amount up to 20% other foodstuff, selected from the group consisting of meat, meat by-products, cereals, flavorants and colorants, 10 to 40% humectant and 20 to 45% moisture, and having a water activity in the range of 0.75 to 0.85.

5. A method of making a firm, coherent gel protein food product comprising the steps of:
forming a mix comprising an aqueous solution or dispersion of 15 to 70% by weight whey protein, said whey protein having been separated from whey under acidic conditions, and 30 to 85% moisture;

adjusting the pH value of said mix to within the range of 6 to 9; and therafter heating said mix at pH 6 to 9 at a temperature and for a period of time sufficient to coagulate said protein.

6. A method of making a firm, coherent gel protein food product comprising the steps of:

forming a mix comprising an aqueous solution or dispersion of by weight 15–60% whey protein, 40–80% animal products selected from the group consisting of meat and meat by-products and mixtures thereof;

said whey protein having been separated from whey under acidic conditions, adjusting the pH value of said mix to within the range 6 to 9, and thereafter heating said mix at pH 6 to 9 at a temperature and for a period of time sufficient to coagulate said protein.

7. A method of making a firm, coherent gel protein food product comprising the steps of:

forming a mix comprising an aqueous solution or dispersion of by weight 5–50% whey protein, said whey protein having been separated from whey under acidic conditions, an effective amount up to 20% fat, 15–60% solid foodstuff, selected from the group consisting of meat, meat by-products and cereals, 5–25% humectant and 5–20% moisture, and having a water activity in the range 0.16–0.75;

adjusting the pH value of said mix to within the range 6 to 9, and thereafter heating said mix at ph 6 to 9 at a temperature and for a period of time sufficient to coagulate said protein.

8. A protein food product comprising heat-coagulated whey protein, said whey protein constituting by weight 5 to 70% of said food product and having been separated from whey under acid conditions, said whey protein having at coagulation a pH of 6 to 9 thereby providing a firm, coherent gel structure.

9. A protein food product according to claim 8 in which said whey protein constitutes from 5 to 50% by weight of said food product and which product contains from 5 to 20% moisture and from 5 to 25% humectant conferring a water activity in the range of from 0.50 to 0.75.

10. A protein food product according to claim 8 in which said whey protein constitutes from 10 to 40% by weight of said food product and which product contains from 20 to 45% moisture and from 10 to 40% humectant conferring a water activity in the range of from 0.75 to 0.85.

11. The food product of claim 1 additionally containing subdivided solid foodstuff selected from the group consisting of cereals, cereal products and nuts.

* * * * *

UNITED STATES PATENT OFFICE
CERTIFICATE OF CORRECTION

PATENT NO. : 4,168,322
DATED : September 18, 1979
INVENTOR(S) : KEITH BUCKLEY and PHILIP J. LOWE It is certified that error appears in the above-identified patent and that said Letters Patent are hereby corrected as shown below:

Column 2, line 50, "0-70 1/2%" should be --0-7 1/2%--.

Column 2, line 52, "mannals" should be --mammals--.

Column 2, line 61, "ceral" should be --cereal--.

Column 8, line 2, "0.16-0.75" should be --0.60-0.75--.

Signed and Sealed this

Fifth Day of February 1980

[SEAL]

Attest:

SIDNEY A. DIAMOND

Attesting Officer

Commissioner of Patents and Trademarks